United States Patent [19]

Jensen

[11] Patent Number: 4,764,025

[45] Date of Patent: Aug. 16, 1988

[54] TURBINE BLADE TEMPERATURE DETECTING PYROMETER

[75] Inventor: Stephen C. Jensen, Edina, Minn.

[73] Assignee: Rosemount Inc., Eden Prairie, Minn.

[21] Appl. No.: 948,403

[22] Filed: Dec. 29, 1986

Related U.S. Application Data

[63] Continuation of Ser. No. 763,909, Aug. 8, 1985, abandoned.

[51] Int. Cl.[4] ............... G01K 1/14; G01J 5/06; G01J 5/60
[52] U.S. Cl. ............................... 374/144; 374/127; 374/128; 356/45
[58] Field of Search ............... 374/10, 121, 123, 126, 374/127, 128, 144; 356/43, 45

[56] References Cited

U.S. PATENT DOCUMENTS

| | | | |
|---|---|---|---|
| 3,454,769 | 7/1969 | Dynes | 250/833 |
| 3,696,678 | 10/1972 | Mossey | 374/123 |
| 3,715,922 | 2/1973 | Menge | 356/45 |
| 3,735,136 | 5/1973 | Flint | 374/123 |
| 3,759,102 | 9/1973 | Murray | 374/127 |
| 3,855,864 | 12/1974 | Douglas | 374/121 |
| 3,992,943 | 11/1976 | Schaefer et al. | 374/127 |
| 4,037,473 | 7/1977 | Compton et al. | 374/125 |
| 4,118,985 | 10/1978 | Compton | 374/127 |
| 4,222,663 | 9/1980 | Gebhart et al. | 356/45 |
| 4,227,369 | 10/1980 | Williams | 374/123 |
| 4,326,798 | 4/1982 | Kahn | 356/45 |
| 4,505,150 | 3/1985 | Seymour et al. | 374/144 |
| 4,579,461 | 4/1986 | Rudolph | 374/126 |
| 4,588,954 | 5/1986 | Seymour | 374/144 |

FOREIGN PATENT DOCUMENTS

| | | | |
|---|---|---|---|
| 2365108 | 9/1977 | France. | |
| 1602160 | 11/1981 | United Kingdom. | |
| 2102564 | 2/1983 | United Kingdom | 374/123 |
| 2045425B | 3/1983 | United Kingdom. | |
| 2123549 | 2/1984 | United Kingdom | 356/43 |
| 197712 | 5/1975 | U.S.S.R. | 356/43 |
| 0621969 | 8/1978 | U.S.S.R. | 356/43 |
| 0557272 | 2/1979 | U.S.S.R. | 356/43 |

OTHER PUBLICATIONS

Pyrometer Temperature Measurements in the Presence of Reflected Radiation by W. H. Atkinson and R. R. Strange, published 1976.

Primary Examiner—William A. Cuchlinski, Jr.
Assistant Examiner—Thomas B. Will
Attorney, Agent, or Firm—Kinney & Lange

[57] ABSTRACT

A temperature detection pyrometer for determining the temperature of a turbine blade detects radiation reflected and emitted from the turbine blade. The reflected radiation is a result of flame and hot carbon particles rather than the emission representing the blade temperature. The radiation is divided into two channels, each of which detects radiation in different, but preferably overlapping wavelength bands, to detectors providing currents proportional to the radiation intensity in the respective channel. The signal from one channel is weighted with respect to the signal from the other by a constant that is equal to the ratio of the radiation in the two channels which is the attributable to the reflected radiation. The difference between the signals, after weighting the one signal by the constant provides an output that is a function of blade temperature only so the blade temperature may be obtained from a calibration curve or a look-up table.

2 Claims, 2 Drawing Sheets

TURBINE BLADE TEMPERATURE DETECTING PYROMETER

CROSS REFERENCE TO RELATED APPLICATION

This application is a continuation of my copending application Ser. No. 763,909, filed Aug. 8, 1985 for Turbine Blade Temperature Detecting Pyrometer, now abandoned.

BACKGROUND OF THE INVENTION

1. Field of the Invention

The present invention relates to a pyrometer and method for measuring the temperature of turbine blades accurately by eliminating or substanitally reducing the effect of reflected radiation from frame or hot carbon particles.

2. Description of the Prior Art

Pyrometers are well known in the art. Also, the use of various optics for receiving radiation being emitted from bodies has been known. U.S. Pat. No. 4,222,663 issued to Gebhard et al. on Sept. 16, 1980, is for an optical pyrometer and technique for temperature measurement, which utilizes an apparatus for correcting errors due to reflected energy from the device being analyzed. A pair of detectors see the same target, but at least one detector has its input filtered, so that the wave length interval of one detector is contained within the other. Conventional detectors are utilized for generating output voltages that are analyzed in a high speed computer. The computer produces an output that compensates for the presence of reflected energy by estimating the magnitude of the reflected energy componet through the calculations. The patent contains no teaching of simplifying the elimination of the reflected radiation component from a turbine blade, as is done in the present application.

U.S. Pat. No. 4,222,663 shows that detectors are conventional, and filters are conventional and also mentions that fiber optic bundles can be utilized.

A two color pyrometer is shown in U.S. Pat. No. 3,715,922 which utilizes two photo devices responding to different wavelengths and teaching the ability to provide a measure of the ratio of received radiation intensities at the two different wavelengths.

Another two color pyrometer is shown in U.S. Pat. No. 3,992,943 used for monitoring the radiation densities of two different wavelengths, which are used for obtaining an indication of temperature. Again, however, there is no teaching of providing weighting factors to output signals from the detectors for eliminating the effect of reflected flame radiation in a turbine.

United Kingdom Pat. No. 2,045,425B shows improvements in pyrometers that provide a scheme for removing errors that are due to the presence of spurious sources of heat. The device also was used specifically for turbine blade temperature measurements, and the specification points out that the measurements can be degraded by the transitory presence of hot carbon particles from the combustion chamber. Thus, while British Pat. No. 2,045,425 points out the problem that is faced, the solution suggested therein requires more complex circuitry than the present device, and does not simplify the use of signal measurements as with the present device.

French Patent Publication No. 77-28335 (2,365,108) relates to an optical system for measuring the temperature of the fins of a turboreactor, and includes filters for passing radiation at two different wavelengths, and detectors that separately detect the radiation levels and provide output signals that are amplified and then passed to a divider circuit that in turn produces analog signals that are representative of the ratio of the amplitudes of the signals from the detectors. The analog signal from the output divider circuit is used in a central processing unit to provide the appropriate measurement of the temperature of the fins of the turbine. However, here too, the use of a weigthing factor in the output from one of the radiation detectors to provide a ratio constant to simplify the detection of actual temperature of the turbine blade is not shown.

U.S. Pat. No. 4,326,798 also shows a pyrometer system with a measurement of temperature from a source of heat which might be contaminated by radiation from a transient spurious source of heat at a higher temperature, and it provides filters to divide radiation detected directly from a turbine blade into two channels which are separately detected and wherein their outputs are divided and fed to a threshhold detector to provide a "flag" output signal if the ratio between the outputs of the two detectors exceeds a predetermined value to thereby indicate an erroneous temperature reading due to the presence of hot carbon particles. Additionally, FIG. 4 of this patent provides output amplifiers from each of the detectors, and provides a scaling factor circuit on the output of one of the amplifiers, which is then fed to a subtraction circuit. However, selecting the proper scaling factor for providing a direct indicator of actual blade temperature, by making the scaling factor proportional to the ratio of the portions of the detector outputs that are attributable to the presence of flame or hot carbon particles is not taught.

SUMMARY OF THE INVENTION

The present invention relates to a temperature detection pyrometer that effectively eliminates spurious reflected radiation from turbine blades caused by hot carbon particles or flame. The sensing is done in a simple manner by dividing the detected radiation into two channels, and filtering at least one of the channels so that the detector used for each channel responds to radiation of different wavelength ranges.

The output of one of the detectors is weighted relative to the other by a factor based on the ratio between the portions of the output signals from the two detectors that is attributable to reflected radiation. This is, each of the detectors provides a total current output, and a portion of the total current from each detector is attributable to the reflected radiation. The ratio between the outputs attributable to this reflected radiation can be determined and used as a weighting or scaling factor.

The difference between the factored output from one of the detectors, and the output from the other detector is provided to a difference amplifier or subtracting circuit, to provide a signal that is directly related to the temperature of the turbine blade. The signal can be used for driving a recorder, sounding an alarm if above a predetermined level or provided to a microprocessor for calculating the actual temperature.

The actual turbine blade temperature is the most important temperature in a turbine. High temperature operation is desired to obtain maximum power or maximum efficiency from a turbine, but excessive temperatures can warp parts and cause irreparable damage.

At present, blade temperatures are determined inferentially by measuring inlet and exhaust gas temperatures. The actual blade temperatures are not known, so to avoid exceeding the maximum rated temperature, a safety factor has to be used with the temperature data presently available which reduces the operating blade temperatures below optimum. The present invention permits controlling the turbine operation at or near optimum temperature without accidentally exceeding the design parameters of the engine parts.

DETAILED DESCRIPTION OF THE PREFERRED EMBODIMENTS

Figure 1:
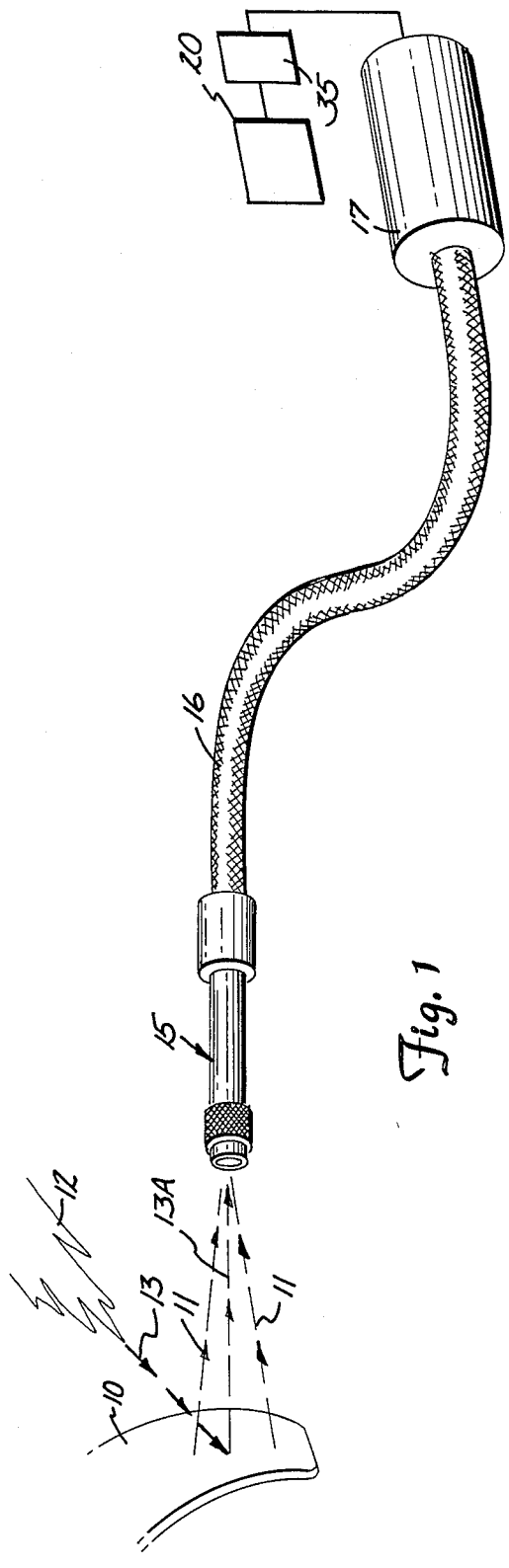
FIG. 1 is a schematic representation of a typical pyrometer optical system sensor providing an output in accordance with the present invention.

In FIG. 1, a turbine blade represented generally at 10 is to have its temperature detected utilizing pyrometer techniques. The turbine blade emits radiation indicated by the arrows 11 that represent the true temperature of the blade. Flame or hot carbon particles illustrated generally at 12 emit radiation indicated by the arrows 13 which then strike the blade 10 and are reflected along a path indicated at 13A, along with arrows 11, toward a pyrometer lens-head assembly of conventional design indicated generally at 15. A fiber optic cable 16 may be used generally for transmitting the radiation received by the lens-head assembly to a preamplifier package made according to the present invention and illustrated generally at 17.

The preamplifier package then is connected to suitable processing circuitry. The preamplifier package output can be coupled to a direct indicating digital output, a recorder, or the like. A table or calibration curve can be used for determining the actual temperature of the blade after the signals have been processed in the preferred circuitry.

Figure 2:
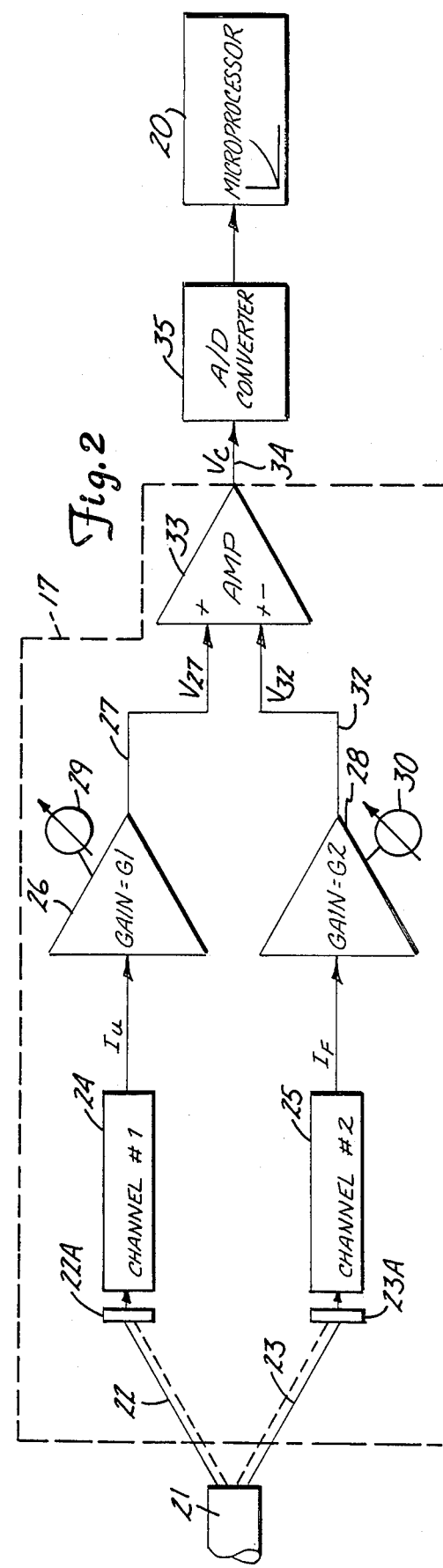
FIG. 2 is a schematic representation of the amplifier and process circuit used for carrying out the present invention.

FIG. 2 illustrates typical circuitry. The end of the optical fiber is illustrated in FIG. 2 at 21, and it emits radiation, which is divided generally into first and second channels or paths 22 and 23. At least one path is filtered, and as shown, two different filters 22A and 23A can be used. The output from first filter 22A is considered an unfiltered channel in the subsequent discussion. After filtering, the radiation in each channel is in a different frequency range (and thus has different wavelength ranges) than the other channel. In the example disclosed herein, the radiation transmitted by the filter 22A will lie within a broad wavelength range, and the radiation transmitted by filter 23A will lie within a selected segment of this range. If desired, the filter 22A can be selected to transmit radiation having wavelengths in an entirely different range from the radiation transmitted by filter 23A.

The radiation level in the first channel 22 from the filter 22A is sensed in a radiation detector 24 which comprises a standard photodiode detector providing an output current ($I_u$). A second radiation detector 25 is used for sensing the radiation in the second path or channel 23 after it has passed through filter 23A, and for providing a current ($I_f$) which represents the current in the filtered pyrometer channel. The radiation detectors are standard detectors commonly used in pyrometers.

The output current ($I_u$) from detector 24 is provided to a first amplifier 26 which converts the detector current to a voltage signal and provides a voltage output along a line 27 ($V_{27}$). A second amplifier 28 is connected to receive the current output ($I_f$) from detector 25 to convert it to a voltage output from amplifier 28 on line 32 ($V_{32}$).

Amplifier 26 has a first gain ($G_1$) that may be adjusted with a gain control 29. The output voltage ($V_{27}$) is proportional to the input current ($I_u$). The second amplifier 28 has a second gain ($G_2$) adjusted by a gain control 30. Second gain $G_2$ over first gain $G_1$ is equal to a scaling factor K; that is $G_2/G_1 = K$. The scaling factor K is used in subsequent equations to null out the portion of the signal that is a result of the reflected radiation of flame and hot carbon particles.

The output of amplifier 28 is connected to one input of an amplifier 33 by line 32. The output of amplifier 26 is connected to the second input of amplifier 33 by line 27.

Amplifier 33 is a difference of subtracting amplifier which provides an output on line 34 representing the difference in the signals on lines 27 and 32. Because the voltages on lines 27 and 32 ($V_{27}$ and $V_{32}$) are proportional to the currents from detectors 24 and 25, the voltage at the output of amplifier 33 on line 34, which is called $V_c$, is proportional to the difference in currents from detectors 24 and 25, that is, $V_c \alpha (I_u - KI_f)$. The voltage $V_c$ as will be shown represents blade temperature directly and may be used for any desired function. As shown, the output of amplifier 33 which is a function of blade temperature with the effect of reflected radiation at least substantially reduced, is connected to a conventional analog to digital converter 35, and the digital output signal from converter 35 is then fed to microprocessor 20. Microprocessor 20 is then programmed for calculating the blade temperature. The solution for temperature (T) is a nonlinear equation, and the correction curve or equation is programmed into the microprocessor 20. A table of values of $V_c$ corresponding to temperatures also may be provided, and placed in the memory of the microprocessor, or the table can be used manually if desired. The correction curve or table may be established experimentally as well. That is, actual controlled temperatures may be sensed and the voltage output note for calibration.

Using the weighting factor (K) to scale the output from one of the amplifiers with respect to the other can be shown to eliminate the reflected radiation effect or value from the output by the following analysis:

$I_f$ = total current detected from detector 25 (filtered)
$I_u$ = total current detected from detector 24 (unfiltered)
$i_f$ = portion of $I_f$ which is due to reflected radiation
$i_u$ = portion of $I_u$ which is due to reflected radiation
$i_{fs}(T)$ = portion of $I_f$ which depends only on blade temperature (T)
$i_{us}(T)$ = portion of $I_u$ which depends only on blade temperature (T).

It can be assumed that the flame is to a reliable approximation at a constant temperature so that the ratio of $i_u$ to $i_f$ is a constant:

$$K = i_u/i_f$$

or $$i_u = K i_f \quad \text{Eq. (1)}$$

The following relationships are established:

$$I_u = i_u + i_{us}(T) \quad \text{Eq. (2)}$$

$$I_f = i_f + i_{fs}(T) \quad \text{Eq. (3)}$$

Substituting Eq. (1) into Eq. (2), and taking the difference of the result with the product of K times Eq. (3), the equation reduces to:

$$I_u - K I_f = i_{us}(T) - K i_{fs}(T) \quad \text{Eq. (4)}$$

Thus, by appropriately weighting one channel output with respect to the other (K) and then taking the difference in amplifier 33, the component of the signal attributable to reflected radiation (flame) can be eliminated or substantially reduced. The output on line 34 is proportional to $I_u - K I_f$ and is thus a function of blade temperature "T" only.

In order to obtain "K", a calibration procedure can be followed which provides K easily. It is known that the temperatures of hot carbon particles and flame may range between 3,500° F. and 4,500° F. The optimum blade temperature is considerably below those temperatures, typically in the range of 2,500° F. A temperature representing an average temperature of the flame and hot carbon particles present in the turbine under consideration is selected. For example, a temperature of 4,200° is typical. Thus in this example, a reference source equivalent to flame at 4,200° F. is provided and is sensed by the pyrometer lens-head assembly 15. Gain controls 29 and 30 for setting the gains $G_1$ and $G_2$ of amplifiers 26 and 28 are adjusted so that when the pyrometer head is viewing the 4,200° F. source, the output from the difference amplifier 33 is nulled, or brought to zero. Under the equation, nulling will result when $G_2/G_1 = K$, or in other words the ratio of the gain factors will be the same as the ratio between the outputs attributable to reflected radiation in each of the channels, when this reference temperature is used. This is the same K as discussed above.

The gain of the difference amplifier 33 can then be adjusted to give a convenient voltage range, for example, zero to ten volts DC for blade temperatures of 1,500° to 2,500° F.

Figure 3:
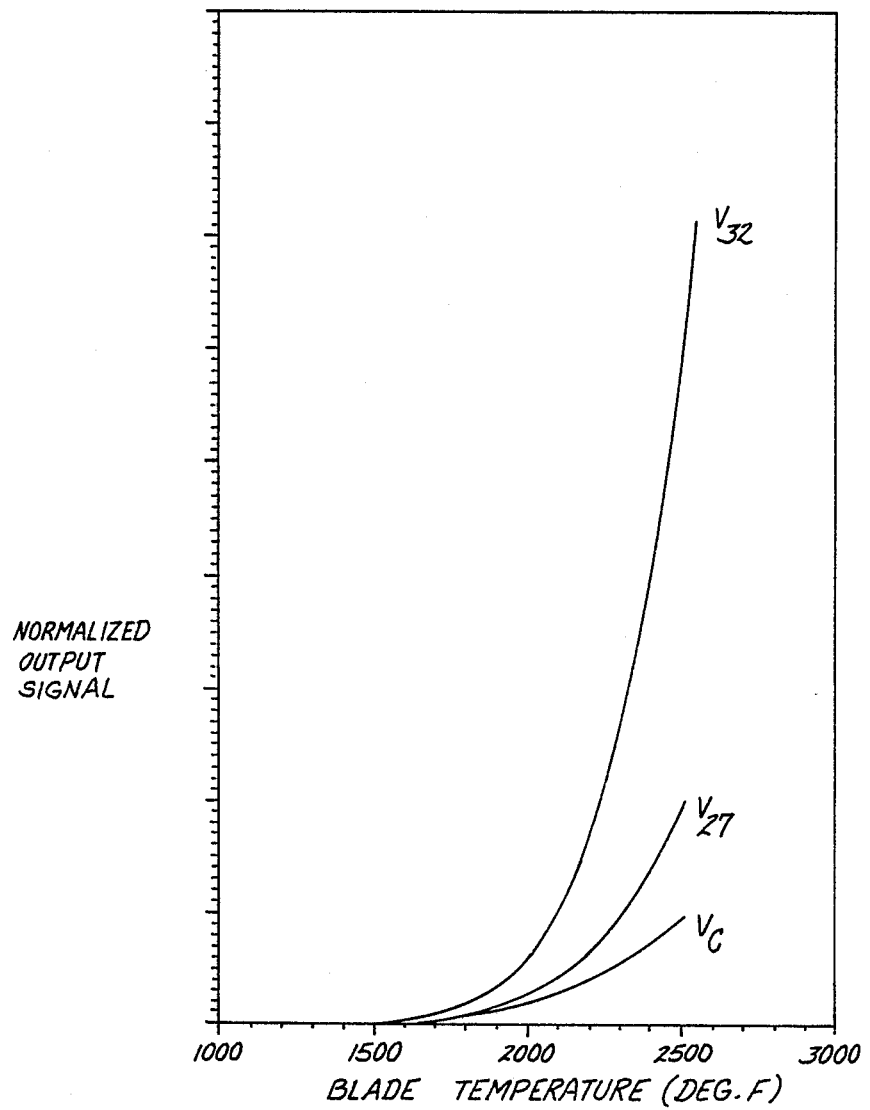
FIG. 3 is a graph illustrating the relationship of normalized output signals to turbine blade temperature.

FIG. 3 illustrates normalized curves modeling the output signals from amplifiers 26, 28 and 33 relative to temperature. The output curves for the outputs of amplifiers 26 and 28 are labeled $V_{27}$ and $V_{32}$, respectively, and the output from amplifier 33 is labeled $V_c$. In FIG. 3, the outputs are normalized at 1,200° F. and the output curve $V_c$ is the modeled output set for a 4,200° F. flame.

It can be seen that the signal $V_c$ is nonlinear and thus microprocessor 20 is programmed to calculate the blade temperature from $V_c$ with a nonlinear program function.

Equation (4) above, indicates that the output $V_c$ is a function of blade temperature only and the effect of reflected radiation has been substantially reduced by use of the scaling factor K.

It should be noted that the scaling factor K can be provided by a separate circuit connected between the output of amplifier 28 and the associated input of amplifier 33, if desired. If is further noted that the output from amplifier 33 ($V_c$) is independent of radiation due to sources at the calibration temperature where K was selected. For other flame and hot carbon particle temperatures, the output ($V_c$) is sensitive to the presence of such flame and hot carbon particles. The present invention substantially reduces such effects.

The elimination or substantial reduction from the output of the reflected radiation component of flame or hot carbon particle effect, as shown, provides reliable, easily used signals for directly obtaining a signal representative of blade temperature.

What is claimed is:

1. A pyrometer for receiving radiation over a wavelength range from a member emitting radiation as a function of temperature of the member, the pyrometer further receiving undesired radiation from a flame adjacent to the member, the flame having arange of flame temperatures substantially higher than the temperature of the member, and the pyrometer also receiving radiation at least once from a reference source having a reference temperature in the range of the flame temperatures, comprising:

sensing means for receiving both the emitted and the undesired flame radiation and for providing first and second outputs, $I_u$ and $I_f$, substantially proportional to the radiation received across different first and second segments respectively of the wavelength range;

comparator means for receiving the first and second outputs and for providing a comparator output which is substantially proportional to an adjusted weighted difference, $I_u - K I_f$, between the first and second outputs, the weighting factor K being adjusted such that the comparator output has a reduced dependence on the undesired flame radiation; and output means for receiving the comparator output and for providing a pyrometer output indicative of the temperature as a nonlinear function of the comparator output; and wherein the weighting factor K has been adjusted such that the comparator output has been substantially nulled when the pyrometer received radiation from the reference radiation source.

2. A method of obtaining a pyrometer output indicative of a temperature of a member emitting radiation as a function of its temperature and received by a pyrometer over a wavelength range of the pyrometer, the pyrometer further receiving undesired radiation from a flame adjacent to the member at the same time that the radiation from the member is received, the flame having a range of flame temperatures substantially higher that the temperature of the member, and the pyrometer also receiving radiation at least once from a reference source having a reference temperature in the range of the flame temperatures, comprising the steps of:

coupling the pyrometer to the reference source;
   sensing the reference radiation over different first and second segments of the wavelength range;
   providing a first output $I_u$ substantially proportional to reference radiation sensed across the first segment of the wavelength range;
   providing a second output $I_f$ substantially proportional to reference radiation sensed across the second segment of the wavelength range;

providing a comparator output which is a weighted difference, $I_u - KI_f$, between the first and second outputs;

adjusting the weighting factor K in the comparator output such that the comparator output is substantially nulled when the reference radiation is received;

decoupling the pyrometer from the reference source and subsequently coupling the pyrometer to the emitted and undesired radiation;

sensing both the emitted and undesired radiation over the first and second segments of the wavelength range;

providing the first output $I_u$ while the emitted and undesired radiation and sensed;

providing the second output $I_f$ while the emitted and undesired radiation are sensed;

providing the comparator output while the emitted and undesired radiation are being sensed; and providing a pyrometer output nonlinear as a function of the comparator output, the pyrometer output indicating temperature based on the comparator output such that the effects of the undesired radiation are substantially reduced.

* * * * *

UNITED STATES PATENT AND TRADEMARK OFFICE
CERTIFICATE OF CORRECTION

PATENT NO. : 4,764,025

DATED : August 16, 1988

INVENTOR(S) : Stephen C. Jensen

It is certified that error appears in the above-identified patent and that said Letters Patent is hereby corrected as shown below:

On the front page of the patent, in the References Cited section, under FOREIGN PATENT DOCUMENTS, insert as a reference:

-- 0119724    9/1984    EPA --.

Column 1, line 17, delete "frame" and insert --flame--; line 23, delete "Gebhard et al." and insert --Gebhart et al.--; line 34, delete "componet" and insert --component--.

Column 2, line 11, delete "weigthing" and insert --weighting--; line 50, after "radiation.", delete "This" and insert --That--.

Column 4, line 32, delete "$V_c a$" and insert --$V_c^\alpha$--.

Column 6, line 17, delete "arange" and insert --a range--; line 52, delete "that" and insert --than--.

Column 8, line 5, delete "and" and insert --are--.

Signed and Sealed this

Twenty-first Day of March, 1989

Attest:

DONALD J. QUIGG

*Attesting Officer*    *Commissioner of Patents and Trademarks*